United States Patent
Amiaux (10) Patent No.: US 11,919,144 B2
(45) Date of Patent: Mar. 5, 2024

(54) INDUSTRIAL DEVICE FOR THE RECHARGING OF AN ELECTROMECHANICAL TOOL WHEN THIS TOOL IS AFFIXED TO A SUPPORT

(71) Applicant: ETABLISSEMENTS GEORGES RENAULT, Saint Herblain (FR)

(72) Inventor: Guillaume Amiaux, Coueron (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 420 days.

(21) Appl. No.: 17/077,407

(22) Filed: Oct. 22, 2020

(65) Prior Publication Data
US 2021/0122027 A1    Apr. 29, 2021

(30) Foreign Application Priority Data
Oct. 24, 2019 (FR) ..................................... 1911904

(51) Int. Cl.
*B25H 1/00* (2006.01)
*B25F 5/00* (2006.01)
(Continued)

(52) U.S. Cl.
CPC ............ *B25H 1/0042* (2013.01); *B25F 5/00* (2013.01); *H02J 7/0048* (2020.01); *H02J 7/02* (2013.01);
(Continued)

(58) Field of Classification Search
CPC ..... B25H 1/0042; B25H 1/0071; H02J 50/10; H02J 7/0048; H02J 7/02; H02J 7/345; H02J 11/33; H02J 2207/50; B25B 21/00
See application file for complete search history.

(56) References Cited

U.S. PATENT DOCUMENTS 3,853,420 A * 12/1974 Abell ................... B25H 1/0042
                                                              408/110
4,105,358 A *  8/1978 Walker ................. B25H 1/0064
                                                              125/20
(Continued)

FOREIGN PATENT DOCUMENTS

| GB | 2189763 A | 11/1987 | |
|---|---|---|---|
| JP | 2003311654 A | 11/2003 | |
| KR | 101014295 B1 * | 2/2011 | .............. H02J 50/10 |

OTHER PUBLICATIONS

English Translation of French Written Opinion dated Jun. 30, 2020 for corresponding French Application No. 1911904, filed Oct. 24, 2019.

(Continued)

*Primary Examiner* — Anna K Kinsaul
*Assistant Examiner* — Lucas E. A. Palmer
(74) *Attorney, Agent, or Firm* — David D. Brush; Westman, Champlin & Koehler, P.A.

(57) ABSTRACT

An industrial device including a portable tool and a support for this tool. The tool is provided with a motor driving a mechanism in rotation, an electrical energy store to power the tool during operation and a controller to control the motor. The support includes a line, one extremity of which is affixed to the tool, a receiving element defining a location for the grasping of the tool and a winding apparatus of said line exerting a vertical tension to the tool so as to lighten its weight when it is no longer at its grasping location. The industrial device further includes a transmission of an electrical energy to charge the energy store when the tool is positioned in the receiving element. The tool is light weight tool while at the same time highly maneuverable in charging supercapacitors or a battery only when the tool is on the support.

10 Claims, 4 Drawing Sheets

(51) Int. Cl.
*H02J 7/00* (2006.01)
*H02J 7/02* (2016.01)
*H02J 7/34* (2006.01)
*H02J 50/10* (2016.01)
*B25B 21/00* (2006.01)
*H02K 11/33* (2016.01)

(52) U.S. Cl.
CPC .............. *H02J 7/345* (2013.01); *H02J 50/10* (2016.02); *B25B 21/00* (2013.01); *H02J 2207/50* (2020.01); *H02K 11/33* (2016.01)

(56) References Cited

U.S. PATENT DOCUMENTS

| | | | | |
|---|---|---|---|---|
| 5,536,979 | A * | 7/1996 | McEachern | H02J 50/90 320/108 |
| 6,565,050 | B1 * | 5/2003 | Pruter | A61B 8/00 248/158 |
| 7,108,459 | B1 * | 9/2006 | Mueller | B25H 1/0057 408/112 |
| 8,482,160 | B2 * | 7/2013 | Johnson | H01F 38/14 307/104 |
| 8,907,623 | B2 * | 12/2014 | Saur | H02J 50/90 320/108 |
| 2003/0003971 | A1 * | 1/2003 | Yamamoto | H02J 50/40 455/573 |
| 2003/0214255 | A1 * | 11/2003 | Baarman | A61L 2/10 315/291 |
| 2006/0087282 | A1 * | 4/2006 | Baarman | H02J 50/10 320/108 |
| 2007/0290654 | A1 * | 12/2007 | Govari | H02J 50/10 320/155 |
| 2009/0212639 | A1 * | 8/2009 | Johnson | H02J 7/0044 307/104 |
| 2009/0212737 | A1 * | 8/2009 | Johnson | A47B 97/00 320/108 |
| 2009/0237029 | A1 * | 9/2009 | Andelfinger | H02J 50/12 320/108 |
| 2011/0143561 | A1 * | 6/2011 | Matthias | H01M 50/213 439/135 |
| 2012/0235636 | A1 * | 9/2012 | Partovi | H04B 5/0093 320/108 |
| 2013/0156518 | A1 * | 6/2013 | Ward | B23B 39/003 408/117 |
| 2013/0314055 | A1 | 11/2013 | Van Der Linde et al. | |
| 2013/0335014 | A1 * | 12/2013 | Ashinghurst | H02J 50/80 320/108 |
| 2014/0035519 | A1 * | 2/2014 | Rejman | B25H 3/02 320/108 |
| 2014/0103858 | A1 * | 4/2014 | Bertsch | H02J 7/342 320/103 |
| 2014/0176065 | A1 * | 6/2014 | Rejman | H02J 50/10 320/108 |
| 2014/0180612 | A1 * | 6/2014 | Rejman | H02J 7/0045 320/108 |
| 2014/0191568 | A1 * | 7/2014 | Partovi | H02M 3/33515 307/31 |
| 2014/0266024 | A1 * | 9/2014 | Chinnadurai | B25F 5/00 320/108 |
| 2014/0353191 | A1 * | 12/2014 | DeCicco | B25H 3/006 206/373 |
| 2014/0361740 | A1 * | 12/2014 | Suzuki | B25H 3/022 320/108 |
| 2015/0069962 | A1 * | 3/2015 | Dietzel | H02J 50/10 320/108 |
| 2015/0115880 | A1 * | 4/2015 | Soar | F41C 23/22 320/108 |
| 2015/0283622 | A1 * | 10/2015 | Babcock | B23B 47/281 81/436 |
| 2015/0318732 | A1 * | 11/2015 | Heine | H02J 50/10 320/108 |
| 2015/0332839 | A1 * | 11/2015 | Stock | H01F 27/255 336/200 |
| 2015/0340153 | A1 * | 11/2015 | Lohr | H01F 38/14 336/200 |
| 2015/0349577 | A1 * | 12/2015 | Breitenbach | H02J 50/10 320/108 |
| 2016/0049799 | A1 * | 2/2016 | Takatsu | B60L 53/126 307/104 |
| 2016/0079801 | A1 * | 3/2016 | Zhang | H02J 7/0044 320/108 |
| 2016/0094051 | A1 * | 3/2016 | Soar | H04B 5/0031 307/9.1 |
| 2016/0099606 | A1 * | 4/2016 | Zhang | H02J 50/10 320/108 |
| 2016/0129582 | A1 * | 5/2016 | Ullrich | B23Q 3/1543 408/76 |
| 2016/0190858 | A1 * | 6/2016 | Zhang | H02J 7/0045 320/108 |
| 2017/0173712 | A1 * | 6/2017 | Cramer | B23D 47/02 |
| 2017/0244262 | A1 * | 8/2017 | Schadow | A41D 1/002 |
| 2018/0102666 | A1 * | 4/2018 | Margaritis | B60R 16/03 |
| 2019/0367066 | A1 * | 12/2019 | Nelson | B62B 3/04 |
| 2020/0021143 | A1 * | 1/2020 | Gonda | B60L 53/124 |
| 2020/0346339 | A1 * | 11/2020 | Biginton | B25H 1/0028 |
| 2021/0008648 | A1 * | 1/2021 | DeGowske | B25H 1/0078 |
| 2021/0075256 | A1 * | 3/2021 | Hur | F16C 11/06 |
| 2021/0154784 | A1 * | 5/2021 | Ko | B23Q 1/0009 |

OTHER PUBLICATIONS

French Search Report and Written Opinion dated Jun. 30, 2020 for corresponding French Application No. 1911904, filed Oct. 24, 2019.
French Technical Report dated Aug. 2019, for corresponding French Application No. 1911904, filed Oct. 24, 2019.

* cited by examiner

INDUSTRIAL DEVICE FOR THE RECHARGING OF AN ELECTROMECHANICAL TOOL WHEN THIS TOOL IS AFFIXED TO A SUPPORT

1. FIELD OF THE INVENTION

The field of the invention is that of the use of a tool in an industrial environment, especially that of automobiles or aeronautics. The invention relates more particularly to electromechanical tools connected to a support by a suspension cable so as to lighten its weight during operations.

2. PRIOR ART

In the industrial field, for example in automobiles or aeronautics, operators use tools to assemble equipment and objects during manufacture. These tools are typically screwdrivers that are operated to carry out screwdriving operations. These tools are used in industrial production lines where workstations are aligned or placed on islands, each workstation being organized in order to optimize both its productivity and its ergonomy The architecture of the screwdriver or of a portable tool generally speaking comprises at least the following elements:
  a shell comprising a handle enabling the tool to be grasped,
  a human-machine interface integrating a starting trigger,
  an electrical motor,
  a battery for the autonomy of the apparatus.

All these elements occupy a certain volume and have a certain weight. These tools are generally suspended above the workstation by the use of a weight-compensating device that compensates for the weight of the tool and brings it to a top position when the operation releases the tool. The weight-compensating device consists of a suspension cable, one extremity of which is affixed to the tool while the other extremity is affixed to a winding apparatus that is placed on a jib crane at a height and exerts a force, approximately equal to the force the weight of the tool and exerted in an opposite sense. In this context, an operator is led to grasp his tool by hand and bring it to the screwing area to carry out the assembly operation. Then, the tool is released and lifted to the level of the weight-compensating device so as not to hamper the operator in his movements at his workstation.

In addition to the suspension cable, these hand tools need electrical energy that is conveyed by a cable with two conductors usually attached to the suspension cable. This electrical cable is connected to a power unit designed to provide sufficient current at a voltage compatible with the tool. These tools can be used either independently of any computer system or in association with a controller, and in any case, the power supply cable can also let through commands and performance parameters and transmit results on the operations performed. The presence of a suspension cable and an electrical cable reduces the flexibility of the entire system and therefore hampers the efficient handling of the tool.

To resolve this problem, electrical cables have been designed that can also serve to suspend the tool. However, the section of these cables is then substantial and can make them rigid so that the tool becomes difficult to handle. In addition, such a cable is very costly.

There are other solutions where the electrical cable has been done away with and replaced by a connection on a horizontal weight-compensating device but this type of solution does not meet the users' expectations of having a tool on a weight-compensating device situated at a height that compensates for the weight of the tool. Furthermore, this approach does not describe any solution of communication between the tool and the controller.

3. PRESENTATION OF THE INVENTION

To this end, an aspect of the invention proposes an industrial device comprising a portable tool and at least one support for this tool, the tool being provided with a motor driving a mechanism in rotation, an electrical energy store to power the tool during operation and a motor control element to control the motor, the support comprising a line, one extremity of which is affixed to the tool, a receiving element defining a grasping location for the grasping of the tool and a winding apparatus of said line exerting a vertical tension to the tool so as to lighten a weight of the tool when it is no longer at the grasping location. The device furthermore comprises an energy transmission link that transmits an electrical energy to charge the energy store when the tool is positioned in the receiving element.

The invention can be used especially to lighten the tool while at the same time keeping it highly maneuverable in charging the electrical energy store only when the tool is on the support.

According to a first embodiment, the transmission link is inductive, the support comprising coils generating an electromagnetic field at the support that is picked up by coils embedded in the tool, such that voltage generated at terminals of the coils recharge the electrical energy store. There are thus no metal elements under voltage that are accessible to users, and this limits risks of electrocution.

According to another embodiment, the transmission link comprises metal hubs coming into contact with metal elements, said hubs and metal elements being affixed, the ones to the support and the other to the tool. In this way, the link for a transmission of energy is simple and costs little and does not generate electromagnetic disturbances.

According to another embodiment, the metal elements are constituted by at least two concentric tracks having a determined width and being placed on a flat surface, said hubs being positioned to come into contact with this flat surface when the tool is in its grasping location. In this way, the tool can be repositioned in its grasping location without any need to turn it in order to set up electrical contact for it to be recharged.

According to another embodiment, the rear part of the tool possesses a conical shape that gets inserted into a symmetrical shape of the receiving element, the transmission link comprises metal hubs coming into contact with metal elements, said hubs being affixed to the annular and oblique surfaces of the conical shape on the support and said metal elements being affixed to the conical surface of the tool, or conversely. In this way, the conical base of the tool is easily guided in its grasping location by the conical cavity of the support.

According to another embodiment, the transmission link also transmits parameters of use of the tool to command the motor when the tool is in operation. In this way, the electrical link is also used to set up the operation of the tool.

According to another embodiment, the electrical energy store is constituted by at least one capacitor. In this way, the electrical energy store in the tool is recharged more rapidly.

According to another embodiment, the winding apparatus exerts a force on the line that increases when the tool approaches the grasping location, the force being exerted at an end of travel holding the tool in this position in drawing the tool towards the receiving element. It is thus made easier to reposition the tool in its grasping location and keep it in this position.

According to another embodiment, the support comprises a blocking element for blocking the tool to prevent it from being removed from the grasping location, said blocking element being commanded by a controller forming part of the industrial device. In this way, the tool is kept on the support at certain instants preventing the operator from taking it and carrying out faulty operations at these points in time.

According to another embodiment, the charging of the electrical energy store of the tool is controlled by said controller. The controller compares a state of charge with a threshold and activates the blocking element of the tool so long as this state is below a predetermined value. Thus, the tool cannot be operated unless the state of charge of its electrical energy store is sufficient to carry out the task.

4. LIST OF FIGURES

Other features and advantages of the invention shall appear from the following description of particular embodiments, given by way of a simple illustrative and non-exhaustive example and from the appended drawings, of which.

5. DESCRIPTION OF PARTICULAR EMBODIMENTS

5.1 General Principle

An aspect of the invention therefore relates to an industrial device comprising a portable tool and at least one support for this tool. The tool is provided with a motor rotationally driving a mechanism, an electrical energy store to power the tool during its operation and motor control element to command the motor. The support comprises a line, one extremity of which is affixed to the tool, a receiving element defining a grasping location for the grasping of the tool and a winding apparatus for winding said line exerting a vertical tension on the tool so as to lighten a weight of the tool when it is no longer at the grasping location. The device furthermore comprises a transmission link that transmits an electrical energy to charge the energy store when the tool is positioned in the receiving element.

An exemplary embodiment of the invention makes it possible especially to lighten the tool to make it handy and to charge the electrical energy store only when the tool is placed on its support.

5.2 Description of One Embodiment

Figure 1:
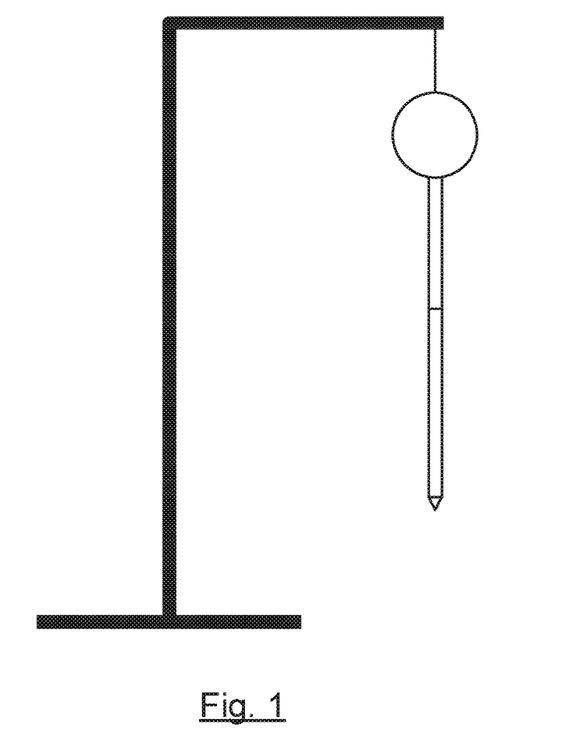
FIG. 1 is a general diagram of an industrial device comprising a tool and a support of this tool, according to one embodiment.

FIG. 1 is a general diagram of an industrial device comprising a tool and a support for this tool according to one example of an embodiment. According to the invention, an industrial tool 1 is hooked to a support 10 at a determined place. This support is for example a jib crane. The tool is placed at a height so as to be highly visible and not hamper the operator's movements at the workstation as well as other objects such as rolling workbenches or handling trolleys. According to the invention, the support has means to lighten the weight of the tool when the operator uses it at his workstation, and this means comprises for example a line or any unspecified mechanical link that retains the tool at height and is capable of supporting its weight.

Figure 2:
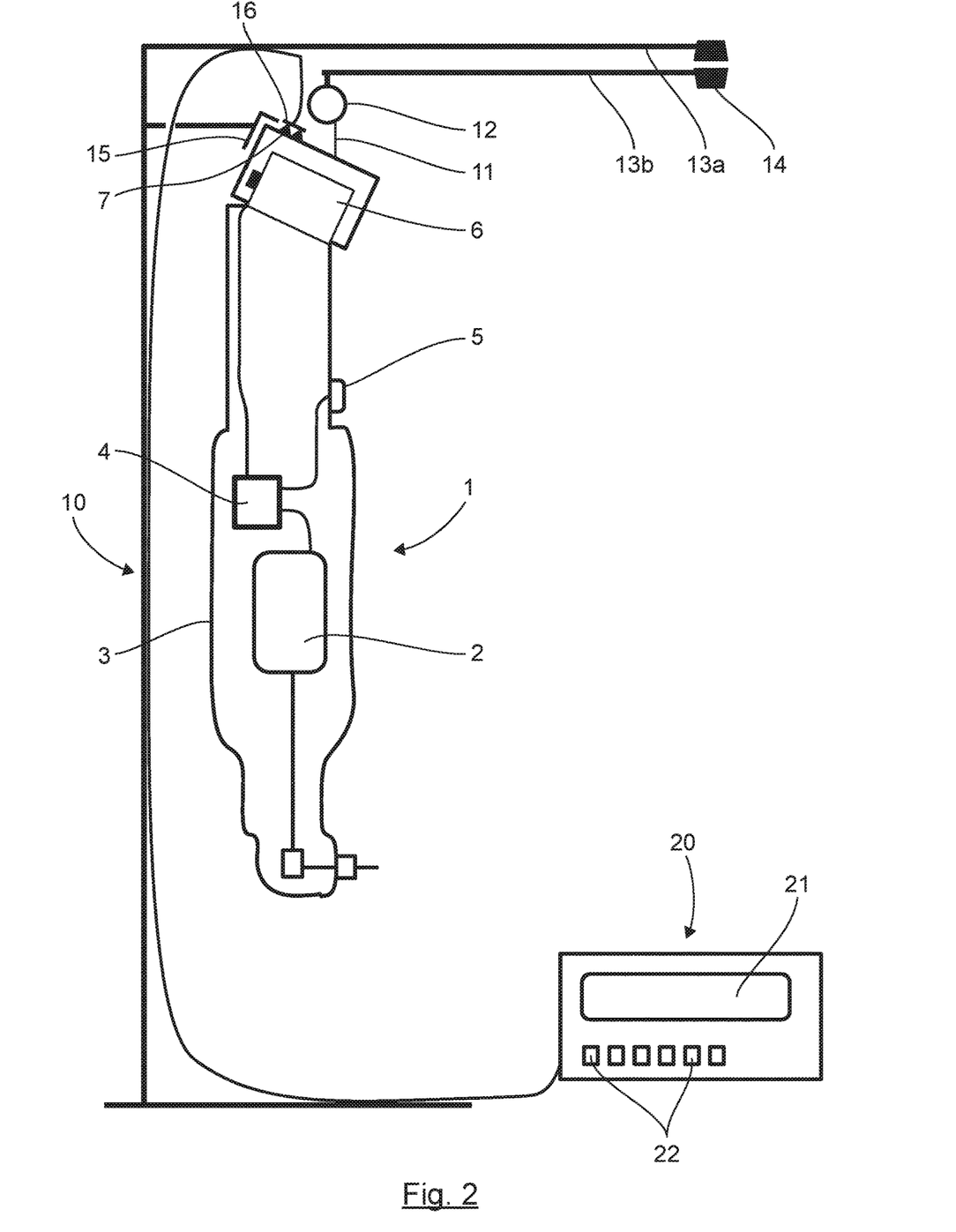
FIG. 2 is a detailed diagram of the main constituent elements of the device according to one example of an embodiment.

FIG. 2 is a detailed diagram of the main constituent elements of the device according to one exemplary embodiment of the invention.

The tool 1 is shown as a screwdriver but the term "tool" can designate any industrial electromechanical tool such as an impact wrench, a drilling machine, a grinding machine, etc. This tool typically comprises a motor 2 rotationally driving a tool-holder with a set of shafts and angle transmission, a protective casing 3 making it possible especially to take the tool. At the electrical level, the tool 1 comprises a central processing unit 4 connected to an interface to communicate with a controller. The central processing unit 4 receives a command from a trigger 5 and controls the power supply of the motor 2 according to parameters transmitted by the controller. The tool is also provided with electrical power supply 6 (also called electrical energy store), typically at least one supercapacitor and/or a battery. In the first variant, the tool comprises a set of high-capacitance capacitors. The term "high capacitance" is understood to mean a capacitance of at least one farad, that ensures not only filtering but also the temporary storage of energy liable to power a motor for at least several seconds. These capacitors are electrically charged by using an electrical connection 7 when the tool is on the support at a determined location. The charging gets interrupted when the tool is taken in the hand and is no longer in the receiving element. During use, the operator takes the tool 1 to the determined location of the support 10 and presses the trigger 5. The central processing unit 4 detects the introduction of this command and closes an electrical switch to power the motor 2.

The support 10 typically has the shape of a jib crane placed on the ground. This in no way excludes it being affixed to the ceiling. The support comprises means to lighten the weight of the tool 1 which is, in the example described, a line 11 held at height by a winding apparatus 12. The upper part of the support comprises two horizontal bars 13a and 13b, possibly telescopic, that are connected to each other at one extremity by a ball joint 14. The lower bar 13b rotates by means of the ball joint along a plane parallel to the axis of the upper bar 13a and situated beneath it. The extremity of the lower bar 13b, which is at the other end of the ball joint 14, moves above the workstation, the winding apparatus 12 being affixed to this extremity.

The winding apparatus 12 has an internal element acting as a spring so that the line 11 exerts a constant, upwardly directed force, the extremity of the line being affixed to the tool. Since the force of the spring is almost identical to that of the weight of the tool, this tool offers almost zero weight to the operator when it moves beneath the horizontal plane where moves the extremity of the lower bar that is opposite the ball joint. The support 10 comprises a means for fixedly attaching 15 the tool in a grasping location, this means consisting for example of a receiving element that forms a receptacle to receive a part of the tool, preferably the part that is affixed to the line. The internal part of the receiving element matches the shape of the casing of the tool in order to keep it at rest in a given grasping position. According to one improvement, magnetic elements affixed to the receiving element 15 will improve the keeping of the tool in this grasping location while not requiring any excessive force in order to unhook it from this location. According to one variant, the tension of the line increases at the end of travel and this force alone is enough to keep the tool in this position by pulling it toward the receiving element in order to place it against its internal surface. The industrial device has an energy transmission link for transmitting energy 16 that comprises equipment conveying electrical energy at the level of the receiving element 15, this equipment cooperating electrically with the connection 7 that is present on the tool. This link comprises for example metal hubs connected to a power supply wires or an induction loop generating a magnetic field picked up by a coil embedded in the tool. In the latter case, the tool has a rectifying device to provide continuous electrical voltage. Whatever the mode of transmission of the intermittent energy transmitted when the tool on its support, this energy makes it possible to charge the electrical power supply 6 of the tool and thus ensure its operation when the operator handles it.

The workstation 1 also comprises a controller 20 intended for providing parameters of use of the tool and receiving operation histories or chronologies. The controller 20 is in communication with the tool 1, using a recharging cable, the electrical connection 7 and the energy transmission link 16. The computerized communication can for example be done by carrier currents according to a technique known per se. Pressing the trigger makes the tool 1 work according to a programming defined by the controller 20. The operator can view the parameters and the chronological data on a screen 21 and has a keypad 22 to introduce numerical values and/or setpoint values of operation.

Figure 3:
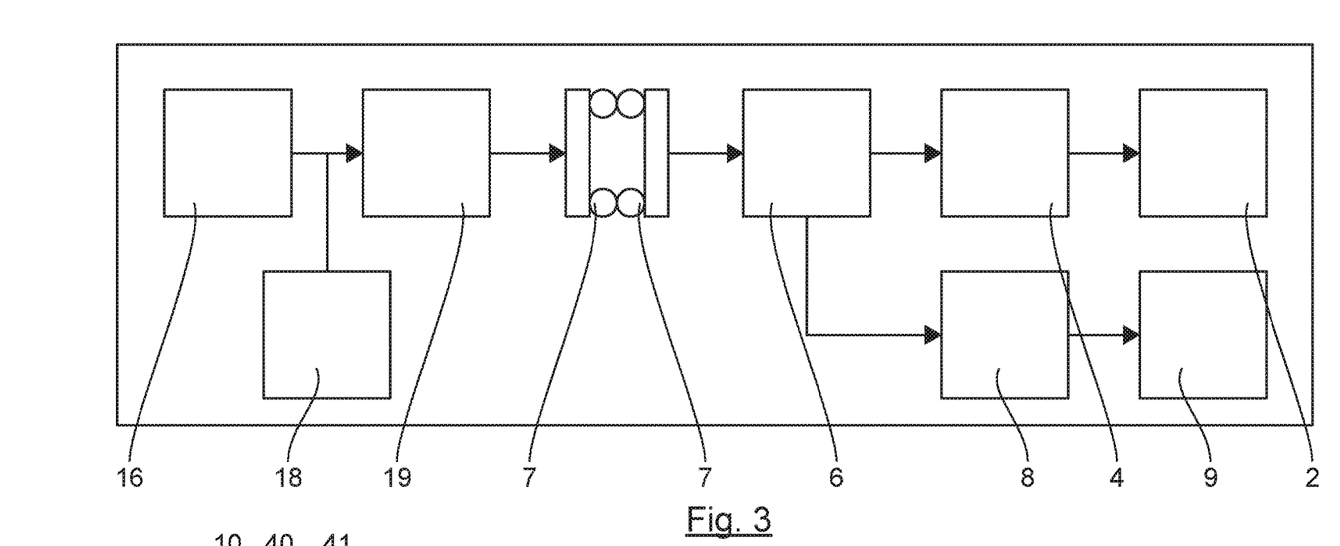
FIG. 3 represents a summary diagram of the electrical elements placed in the tool and in a device for electrical recharging according to one example of an embodiment.

FIG. 3 is a summary diagram of the main electrical elements placed in the tool and in a recharging device for recharging it electrically. This recharging device can be in the controller 20 or in a separate device. The left-hand part of FIG. 3 describes the main components present in the tool support, and the right-hand part shows the electrical components embedded in the tool. The transmission of energy is done by the electrical connection 7 of the tool and by the energy transmission link 16 present on the support 10.

The support 10 comprises a power supply 16 that constitutes an energy source for the workstation. This circuit provides a continuous voltage from the local electrical supply network, generally called the "power grid". This power supply mode can be backed up by one or more supercapacitors 18 that can make up any power supply break and will which increase the electrical energy that is immediately available. The electrical current thus generated is transmitted to a limiter 19 responsible for powering the energy transmission link 16 with values enabling the efficient operation of the motor. As stated above, the electrical coupling with the tool can be obtained with metal contacts, or by induction, or again optically with photoelectric emitters and receivers.

The tool 1 receives energy through the connection 7 and transmits it to the electrical power supply 6, this supply being constituted by supercapacitors and/or a battery. This supply is then capable of continually powering the tool even if it is no longer on its support 10. The supercapacitors embedded in the tool provide high power surges in the event of any need on the part of the motor. The electrical energy embedded is transmitted to the control circuit 4 responsible for commanding the motor 2, and to a voltage regulation circuit 8 which supplies the electronic board 9 with well-regulated continuous current.

Figure 4:
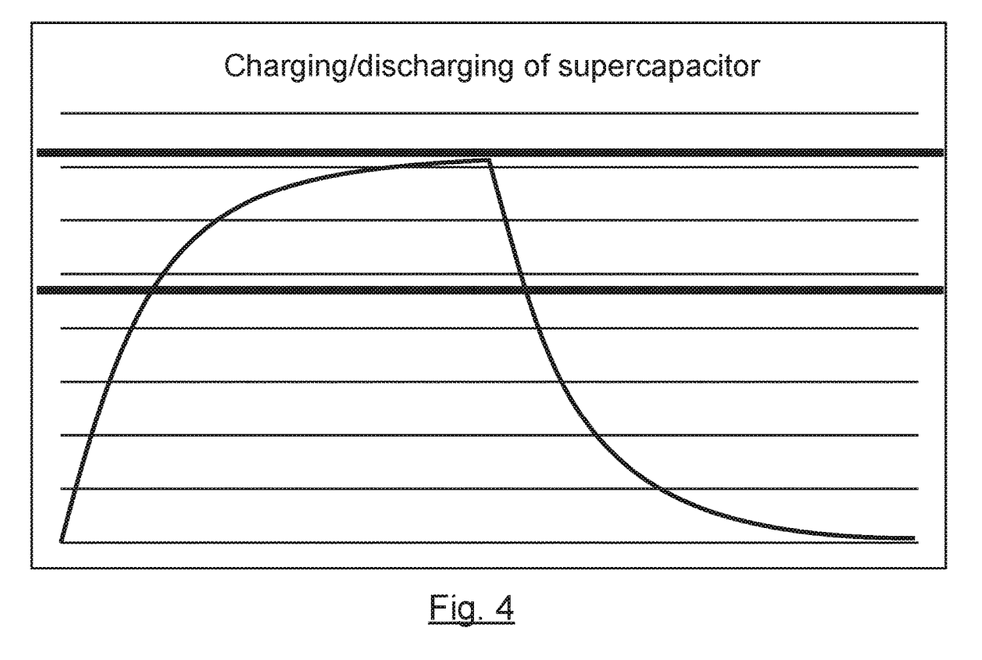
FIG. 4 shows a variation of the voltage across the terminals of a supercapacitor embedded in the tool as a function of its state of charge.

FIG. 4 presents the variation of the voltage across the terminals of the supercapacitors embedded in the tool as a function of the state of charge. Let us take a tool for which the power supply voltage is 18 volts. We choose a maximum voltage for the supercapacitors of 24V and a minimum voltage of 18V. We have a usable energy of:

$$E_{stored} = \tfrac{1}{2}CV_{max}^2$$

$$E_{utilizable} = \tfrac{1}{2}CV_{max}^2 - \tfrac{1}{2}CV_{min}^2 = \tfrac{1}{2}C(V_{max}^2 - V_{min}^2)$$

Giving efficiency of:

$$E_{ff} = \frac{(V_{max}^2 - V_{min}^2)}{V_{max}^2} = \frac{24*24 - 18*18}{24*24} = 43\%$$

A tightening operation at 10 N·m consumes energy of 130 J. The energy needed to carry out a sequence of 10 screwing operations is computed thus:

$$E_{stored} = \frac{130J * 10}{43\%} = 3023J$$

Such an energy requires a supercapacitor with a value:

$$C = \frac{E_{stored} * 2}{V_{max}^2} = \frac{3023J * 2}{24 * 24} = 10.5F$$

The motor can be used for a voltage included between the two solid and horizontal lines shown in FIG. 4. The electronic board 9, for its part, requires a stabilized voltage in order to function and therefore needs a regulator in order to function.

According to one improvement, the support 10 comprises a blocking element for blocking the tool in the grasping position. This blocking element prevents the operator from taking this tool. This blocking element is advantageously commanded by the controller 20 which thus determines the points in time when the tool can be used and those when it must stay on its support. A first case of use concerns the recharging of the electrical power supply 6 of the tool which is controlled by the controller 20. Once the tool is in its grasping location, the controller 20 compares the state of charge with a threshold and so long as this state is below a predetermined value, for example 80%, the tool is blocked in its grasping position by a mechanical device integrated into the receiving element. A visible or auditory piece of information, for example a red indicator light, is activated when the tool is blocked and when its current charge does not enable optimal use. This charge threshold is programmable directly or by learning. Depending on the energy needed to carry out an assembly operation, the minimum charging time during which the tool is blocked is adjusted at the workstation. In such a way, it is possible to minimize the charging time while at the same time making sure that a certain number of screwing operations can be executed up to the very end. Another case of use relates to the fact that the controller 20 is associated with several tools and manages their sequences of use. The workstation comprises for example a drill, a low-torque screwdriver and a grinding machine. The work to be carried out at this station consists of the use first of all of the drill and then of the low-torque screwdriver and finally of the grinding machine. These three tools have their own supports 10 and are controlled by the same controller 20. According to this case of use, the controller unblocks only one tool at a time in complying with the sequencing defined by the work to be carried out.

5.3 Transmission of Electrical Energy

Figure 5:
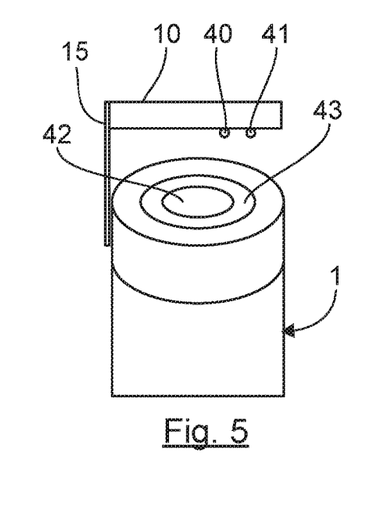
FIG. 5 is a diagram of transmission of electrical energy to the tool comprising metal hubs.

The transmission of energy at the weight-compensating device can be done in two different ways. FIG. 5 describes a first embodiment. According to this embodiment, the energy transmission link 16 comprises metal hubs 40 and 41 affixed to the support 10 that come into contact with concentric metal tracks 42 and 43 that are of a determined width and are placed on the flat surface constituting the rear base of the tool. These hubs are mounted on springs so as to exert pressure on the tracks and thus improve the electrical contact. The fact of using concentric tracks prevents a determined orientation of the tool when the operator places it in its grasping location. The circular shape of the receiving element 15 ensures the centering. The hubs 40 and 41 providing electrical energy are polarized, the hub 40 being connected to the plus pole of the continuous voltage and the hub 41 to the minus pole of this voltage. The hub 40 is electrically connected to the concentric track 42 furthest towards the center and the hub 42 is electrically connected to the concentric track 43 furthest towards the periphery. This embodiment makes it possible to transmit energy greater than that given by an induction device, but this embodiment requires the supplying of voltage that is applied to the conductive parts accessible to the user but that is not dangerous. According to one alternative embodiment, the metal hubs that are placed at the base of the tool 1 and come into contact with the concentric metal tracks having a determined width that are affixed to the receiving element.

Figure 6:
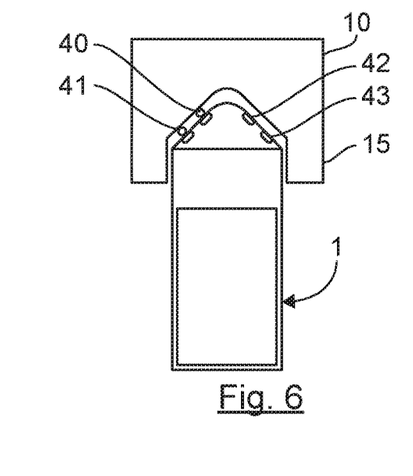
FIG. 6 is a diagram of an alternative embodiment for transmitting electrical energy to the tool by using conical shapes.

FIG. 6 describes a second embodiment in which the rear of the tool has a conical shape. To carry out a more efficient positioning of the electrical contacts, the rear part of the conical tool gets inserted into a symmetrically shaped cavity constituting the receiving element 15 affixed to the support 10. The internal surface of the conical cavity of the receiving element 15 possesses metal hubs 40 and 41 that come into contact with concentric metal tracks 42 and 43 that have a determined width and are placed on the conical surface of the rear base of the tool. These tracks constitute an annular and oblique surface about the axis of the base of the tool. According to one alternative embodiment, the metal hubs are placed at the base of the tool 1 and come into contact with the concentric metal tracks of a determined width that are affixed in the conical cavity of the receiving element.

Figure 7:
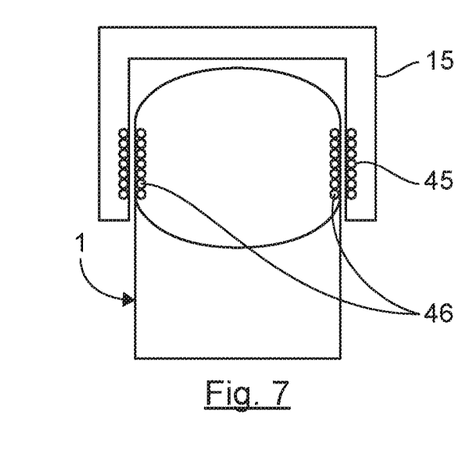
FIG. 7 illustrates an alternative embodiment in which the transmission of energy is done by induction.

FIG. 7 describes a third embodiment in which the transmission of energy is done inductively. The tool 1 gets inserted into a receiving element 15, the internal surface of the receiving element 15 and the external shape of the rear base of the tool being preferably cylindrical. A coil 45 is inserted into the flank of the cylindrical cavity of the receiving element at a determined height, a coil 46 is implemented just beneath the surface of the flank of the rear base of the tool 1, at a height enabling it to be placed facing the coil 45 when the tool is completely inserted into the receiving element. The current passes through the coil 45 thus generating a magnetic field that is picked up by the coil 46 of the tool and produces an electrical voltage. This voltage is then rectified and filtered in order to power the circuits and charge the electrical power supply 6.

This third embodiment has many advantages:
the energy transmission link is completely sealed and in principle has no rough surfaces that could allow dust to get affixed,
no electrical contact is accessible to the operator, and there is therefore no risk of electrocution,
the energy transmission link comprises no metal contact and therefore no wearing surface because of these contacts.

In the field of wireless recharging (Qi standard) there are known ways of transmitting power of 15 W, using for example an ST Microelectronics STWBC-EP circuit. The firm NXP is currently sampling wireless charge controllers with a power of 65 W (NXP WPS-65WS), allowing the following charging times for cycles of 5 screwing operations at 2 N·m:

$$T_{ST} = \frac{130J * 5}{15W} = 43s$$

$$T_{NXP} = \frac{130J * 5}{65W} = 10s$$

The central processing unit 4 embedded in the tools 1 regularly records pieces of information enabling the state of work to be controlled. These pieces of information are for example of the following type:
counting the number of screwing operations performed on the part,
sending back information on the tightening torque,
sending back information on the tightening angle,
sending a tightening report,
screwing curves.

These pieces of information are transmitted to the controller 20 from the tool. The method envisaged is the modulation of charging current on the tool side and then demodulation on the controller side.

Whatever the embodiment described by FIGS. 5, 6 and 7, the tool providing the energy to the transmission link 16 detects the presence of the electrical current and therefore the fact that the tool 1 is properly positioned in the receiving element 15. In this position, this device lights up a light indicator that is preferably green, to inform the operator that the tool is properly positioned and that its electrical power supply is being charged.

Figure 8:
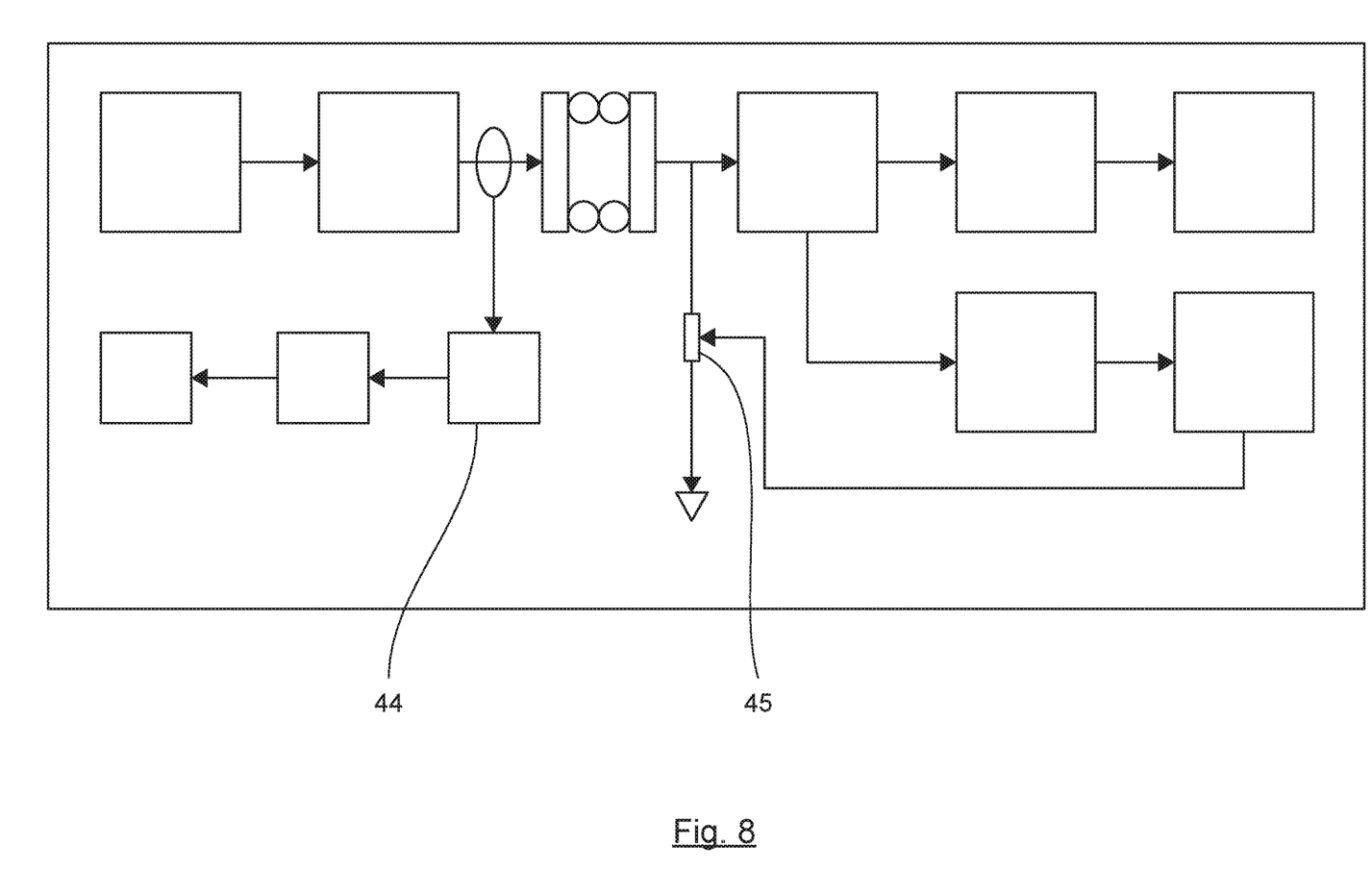
FIG. 8 illustrates an alternative embodiment in which the transmission of energy is done by induction way.

FIG. 8 presents a summary diagram of the main electrical elements enabling the communication of data by carrier current between the support and the tool, according to one embodiment. These data are especially parameters of use of the tool 1 intended to command the motor 2 when the tool is in operation. The support comprises a device 44 to control an induction loop about the power supply wires. This loop generates a high-frequency component that is transmitted to the tool. A reception device 45 for receiving high-frequency signals is embedded in the tool to pick up the signals thus transmitted and send them to the electronic board 9 where they are demodulated and converted into parameters of use.

An exemplary embodiment of the present disclosure provides an efficient solution to at least some of the problems stated above.

In particular, at least one embodiment lightens the tool through a suspension by facilitating the ease of handling of the tool to the greatest possible extent.

Although the present invention has been described with reference to the particular embodiments illustrated, it is in no way limited by these embodiments but is limited only by the appended claims. In particular, the electromechanical tool concerned can be a screwdriver, an impact wrench, a grinding machine, a drill, or any other electrical and portable tool capable of being hooked to a support. It will be noted that changes or modifications could be made by those skilled in the art.

The invention claimed is:

1. An industrial device comprising:
   a portable tool which comprises a motor driving a mechanism in rotation, an electrical energy store to power the tool during operation and a motor control element to control the motor;
   at least one support for the tool, the support comprising a line, one extremity of which is affixed to the tool, a receiving element defining a grasping location for the grasping of the tool and a winding apparatus of said line exerting a vertical tension to the tool so as to lighten a weight of the tool when the tool is no longer at the grasping location; and
   a transmission link that transmits an electrical energy to charge the energy store when the tool is positioned in the receiving element.

2. The industrial device according to claim 1, wherein the transmission link is inductive, the support comprising coils generating an electromagnetic field at the support that is picked up by coils embedded in the tool, such that voltage generated at terminals of the coils recharge the electrical energy store.

3. The industrial device according to claim 1, wherein the transmission link comprises metal hubs coming into contact with metal elements, said hubs being affixed to the support and said metal elements being affixed to the tool, or said hubs being affixed to the tool and said metal elements being affixed to the support.

4. The industrial device according to claim 3, wherein the metal elements are constituted by at least two concentric tracks having a determined width and being placed on a flat surface, said metal hubs being positioned to come into contact with this flat surface when the tool is in the grasping location.

5. The industrial device according to claim 1, wherein a rear part of the tool possesses a conical shape that gets inserted into a symmetrical shape of the receiving element, wherein the transmission link comprises metal hubs coming into contact with metal elements, and wherein said metal hubs are affixed to annular and oblique surfaces of the conical shape on the support and said metal elements are affixed to a surface of the conical shape of the tool, or conversely.

6. The industrial device according to claim 1, wherein the transmission link is configured to transmit parameters of use of the tool that command the motor when the tool is in operation.

7. The industrial device according to claim 1, wherein the electrical energy store is constituted by at least one capacitor.

8. The industrial device according to claim 1, wherein the winding apparatus exerts a force on the line that increases when the tool approaches the grasping location, the force being exerted at an end of travel holding the tool in this position in drawing the tool towards the receiving element.

9. The industrial device according to claim 1, wherein the support comprises a blocking element which prevents the tool from being removed from the grasping location, said blocking element being commanded by a controller forming part of the industrial device.

10. The industrial device according to claim 9, wherein charging of the electrical energy store of the tool is controlled by said controller and said controller compares a state of charge with a threshold and activates the blocking element of the tool so long as this state is below a predetermined value.

* * * * *